Feb. 20, 1951  M. E. TITUS  2,542,731
SLACK ELIMINATOR FOR TRIP ROPES
Filed Jan. 27, 1948
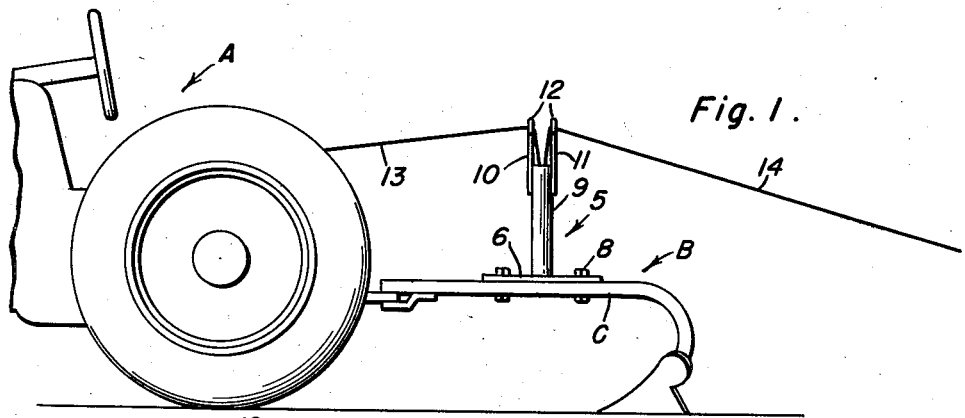
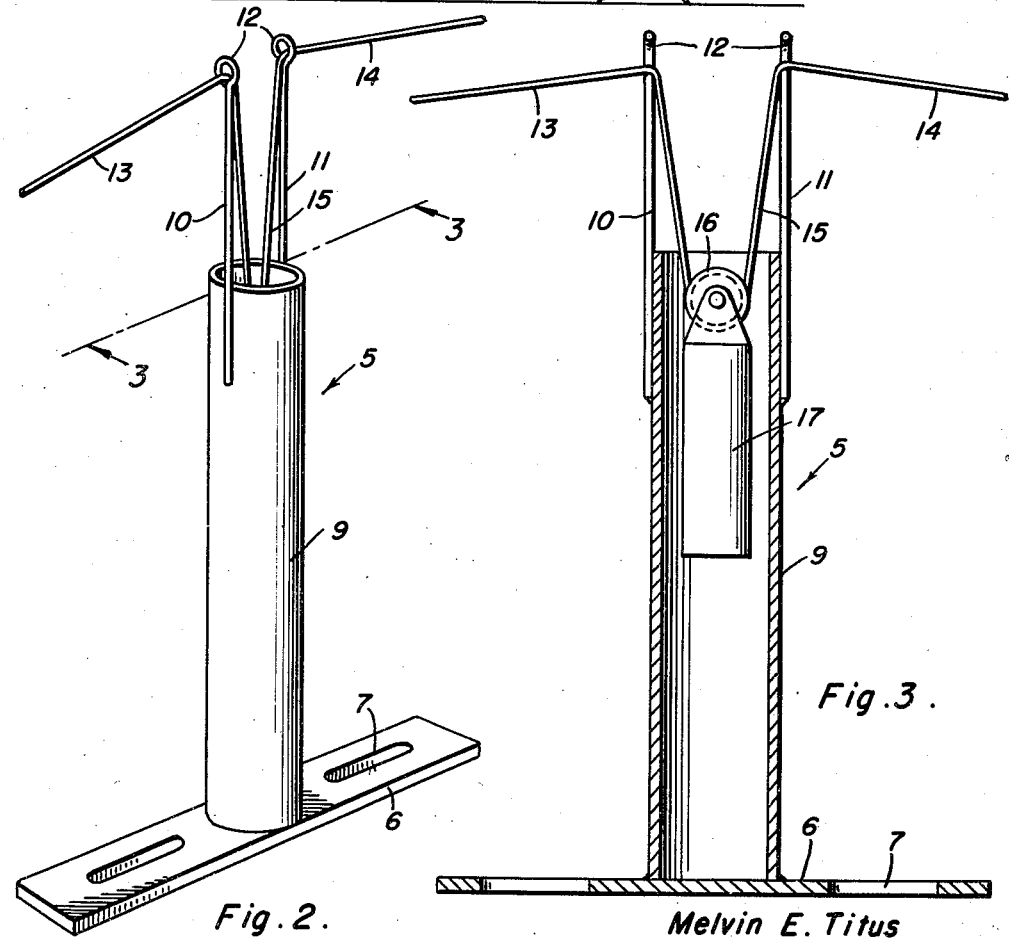
Melvin E. Titus
INVENTOR.

Patented Feb. 20, 1951

2,542,731

UNITED STATES PATENT OFFICE 2,542,731

SLACK ELIMINATOR FOR TRIP ROPES

Melvin E. Titus, Battle View, N. Dak.

Application January 27, 1948, Serial No. 4,585

3 Claims. (Cl. 97—47)

The present invention relates to a novel and improved slack eliminator for trip ropes such as are situated between a tractor at one end and a press drill at the opposite end.

Ordinarily, where a tractor is provided with a trailing plow, and there is a press drill in the rear of or behind the plow, it is necessary to use a trip rope which runs from the press drill, over the plow and forwardly to the tractor where it is controlled by the operator of the tractor. There has been a long felt need to provide ways and means whereby slack in said trip rope could be automatically taken up. It is therefore the purpose of the present invention to provide a simple and practical slack takeup device which is preferably mounted on the beam of the plow and which is of utmost simplicity and efficiency in operation.

In carrying out the principles of the invention I have evolved and produced a simple and practical trip rope slack takeup device which is not likely to foul and which is substantially tangle-proof, thereby to assure operation of same regardless of the shortness of turns made by the tractor in relation to the other equipment.

Another object of the invention is to provide a simple and practical slack takeup device which is characterized by cylinder and a weight, the weight being located in the cylinder and serving to put the rope under tension and to therefore provide an arrangement which will operate efficiently regardless of high winds, and rocky irregular surfaces over which the conveyances must pass during operational periods.

A further object of the invention is to provide a trip rope slack takeup in which the tensioned portion of the rope is situated in a cylinder whereby to prevent the rope from swinging and flying about and catching on other parts of the equipment.

Other objects and advantages will become more readily apparent from the following description of the accompanying illustrative drawings.

In the drawings:

Figure 1 is a fragmentary side elevational view showing a portion of a tractor and a portion of a plow and the slack takeup device on the plow, Figure 2 is a perspective view of the device per se, Figure 3 is a section on the line 3—3 of Figure 2 looking in the direction of the arrows.

Briefly summarized, and by way of introduction to the following detailed description, it will be seen that I take a simple piece of pipe, which provides the cylinder and which is open at opposite ends. The lower open end is fastened to a base plate and the base plate serves to close in said open end and to provide means for attachment of the cylinder to a beam. Elongated rods on the upper, unobstructed, open end of the cylinder serve to saddle the looped portion of the rope so that it may hang down properly in the upper, open end portion of the cylinder. The rods are sufficiently long that they position the guide eyes well above the open end of the cylinder so as to render the weighted pulley freely accessible for initial assembling and subsequent repair purposes.

Referring now to the drawings the tractor in Figure 1 is denoted by the reference character A and the plow by the reference character B. The invention as a unitary device is denoted by the numeral 5 and is preferably mounted on the beam C of the plow. The invention comprises a suitable base plate 6 with slots 7 bolted as at 8 to the beam. The part rising from the base is a cylinder of appropriate height and diameter, the same being denoted by the numeral 9. Mounted on diametrically opposite sides and substantially atop the cylinder are rods 10 and 11 having guide eyes 12 to permit passage of portions of the rope. The portion 13 goes to the tractor and the portion 14 to the press drill (not shown) which trails behind the plow. That portion of the rope which is located between the rods 10 and 11 and over the cylinder, the portion 15, sinks down into the cylinder where it is put under tension by a sheave or pulley 16 carrying a weight 17 of an appropriate size.

With this arrangement it is obvious that the portion 15 of the rope is at all times put under stress by the pulley and weight means and that the crotch portion of the rope sinks down into the cylinder where it is out of the way. The weight and the pulley are also in the cylinder, under ordinary circumstances.

The invention is of such utmost simplicity that the features and advantages already asserted will be clear to the reader.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A trip rope slack eliminator adapted for attachment to the beam of a plow comprising a base adapted to be detachably bolted on said beam, a vertically disposable cylinder mounted on said base and closed at its lower end and uncovered and open at its upper end, a pair of diametrically opposite vertically elongated rods secured to the upper open end portion of the cylinder and projecting at diametrically opposite points well above said cylinder and terminating in rope guide eyes, a rope having portions passing through said eyes and looped in said cylinder, a weight, and a pulley carried by said weight, said rope having the bight portion of the loop connected with said pulley, the weight and pulley being situated wholly within the confines of the cylinder.

2. In a structure of the class shown and described, in combination, a tractor and a plow hitched thereto, said plow including a beam, a trip rope, a weighted pulley attached to a portion of said rope to put said portion under tension and to take up unnecessary slack, a vertically disposed cylinder, said cylinder being closed at its bottom and provided with rigid base means adjustably mounted on said beam, said cylinder being wholly uncovered and constantly open at its top, guide eyes rigidly mounted on the upper end portion of the cylinder and located at points diametrically opposite to each other, portions of said trip rope passing slidably through said guide eyes, the portion of the rope between said guide eyes being a depending loop and being housed, in conjunction with the weighted pulley, in said cylinder.

3. A trip rope slack eliminator adapted for attachment to the beam of a plow comprising a horizontally elongated base plate provided with slotted end portions for adjustable attachment to the plow beam, an open-ended cylinder, the lower end of said cylinder being secured to said base plate, closed by the latter, the upper portion of the cylinder rising well above said plate and the upper end being wholly uncovered and open, a pair of diametrically opposite vertically elongated rods secured to the upper open end portion of the cylinder and projecting well above the cylinder and terminating in rope guide eyes, a weight, a pulley carried by the upper end of said weight, said weight and pulley being confined wholly within the cylinder and accessible by way of the upper open end of the cylinder, and a trip rope having portions trained slidably through said guide eyes, having the portion between said rods looped down into the cylinder and trained about said pulley, the extending portions of the rods being comparable in degree to the length of the weight to render latter freely accessible and to facilitate threading of the rope through the guide eyes and pulley.

MELVIN E. TITUS.

REFERENCES CITED

The following references are of record in the file of this patent:

UNITED STATES PATENTS

| Number | Name | Date |
|---|---|---|
| 1,458,654 | Hotopp | June 12, 1923 |
| 1,851,968 | Classen | Apr. 5, 1932 |
| 1,914,933 | Western | June 20, 1933 |
| 2,128,300 | Johnson | Aug. 30, 1938 |
| 2,214,759 | Bosch, Jr. | Sept. 17, 1940 |
| 2,332,065 | Ego | Oct. 19, 1943 |